(12) United States Patent
Wieder et al.

(10) Patent No.: US 9,944,261 B2
(45) Date of Patent: Apr. 17, 2018

(54) METHOD FOR CONTROLLING A PRESSURE CONTROL DEVICE OF A PRESSURE-MEDIUM BRAKE SYSTEM OF A VEHICLE

(71) Applicant: Knorr-Bremse Systeme fuer Nutzfahrzeuge GmbH, Munich (DE)

(72) Inventors: Gerhard Wieder, Besigheim (DE); Andreas Schaefers, Hemmingen (DE); Peter Holobradi, Budaoers (HU)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 15/095,762

(22) Filed: Apr. 11, 2016

(65) Prior Publication Data

US 2016/0304070 A1    Oct. 20, 2016

Related U.S. Application Data

(63) Continuation of application No. PCT/EP2014/071615, filed on Oct. 9, 2014.

(30) Foreign Application Priority Data

Oct. 11, 2013    (DE) .................. 10 2013 016 877

(51) Int. Cl.
*B60T 8/48*    (2006.01)
*B60T 13/68*   (2006.01)
(Continued)

(52) U.S. Cl.
CPC ............ *B60T 8/4818* (2013.01); *B60T 8/175* (2013.01); *B60T 8/176* (2013.01); *B60T 8/1755* (2013.01);
(Continued)

(58) Field of Classification Search
CPC ...... B60T 8/4818; B60T 8/175; B60T 8/1755; B60T 8/176; B60T 8/327; B60T 8/361; B60T 13/686
(Continued)

(56) References Cited

U.S. PATENT DOCUMENTS 4,238,955 A    12/1980  Reinecke
4,805,105 A *  2/1989   Weiss ................. B60T 8/00
                                              303/DIG. 3
(Continued)

FOREIGN PATENT DOCUMENTS

DE    10 2010 010 606 A1    9/2011
SU          965346 A3       10/1982

OTHER PUBLICATIONS

International Preliminary Report on Patentability (PCT/IB/326, PCT/IB/338 & PCT/IB/373) issued in PCT Application No. PCT/EP2014/071615 dated Apr. 21, 2016, including English translation of document C2 (German-language Written Opinion (PCT/ISA/237)) previously filed on Apr. 11, 2016 (17 pages).

(Continued)

*Primary Examiner* — Thomas J Williams
*Assistant Examiner* — Mariano Sy
(74) *Attorney, Agent, or Firm* — Crowell & Moring LLP

(57) ABSTRACT

A method is provided for controlling a pressure control device of a pressure-medium brake system of a vehicle which individually controls brake pressures in brake cylinders of wheels of an axle. The pressure control device includes a relay valve. In order to compensate for response sluggishness of the relay valve, shut-off valves connected between the relay valve and their respective brake cylinders are not switched into a passage position in which pressure is forwarded to the brake cylinders until a permissible pressure (Continued)

gradient exists between the working pressures of the relay valve and the brake pressures in the brake cylinders.

17 Claims, 8 Drawing Sheets

(51) Int. Cl.
| | |
|---|---|
| *B60T 8/32* | (2006.01) |
| *B60T 8/36* | (2006.01) |
| *B60T 8/175* | (2006.01) |
| *B60T 8/1755* | (2006.01) |
| *B60T 8/176* | (2006.01) |

(52) U.S. Cl.
CPC .............. *B60T 8/327* (2013.01); *B60T 8/361* (2013.01); *B60T 13/686* (2013.01)

(58) Field of Classification Search
USPC .............................. 303/113.2, 119.1; 701/78
See application file for complete search history.

(56) References Cited

U.S. PATENT DOCUMENTS

| | | | | |
|---|---|---|---|---|
| 5,718,486 | A * | 2/1998 | Vollmer | B60T 8/00 303/15 |
| 7,020,551 | B2 * | 3/2006 | Goebels | B60R 16/0233 280/5.502 |
| 9,002,610 | B2 * | 4/2015 | Eberling | B60T 8/361 303/10 |
| 9,505,386 | B2 * | 11/2016 | Wieder | B60T 15/027 |
| 2006/0152075 | A1 * | 7/2006 | Goebels | B60T 8/327 303/119.1 |
| 2007/0236084 | A1 * | 10/2007 | Frank | B60T 8/327 303/119.2 |
| 2009/0184568 | A1 * | 7/2009 | Bensch | B60T 8/32 303/115.2 |
| 2011/0144855 | A1 * | 6/2011 | Herges | B60T 8/1708 701/29.1 |
| 2011/0193407 | A1 * | 8/2011 | Wohltmann | B60T 8/327 303/139 |
| 2013/0073165 | A1 * | 3/2013 | Roether | B60T 8/327 701/78 |
| 2014/0319904 | A1 * | 10/2014 | Watanabe | B60T 13/665 303/119.1 |

OTHER PUBLICATIONS

International Search Report (PCT/ISA/210) issued in PCT Application No. PCT/EP2014/071615 dated Jan. 20, 2015 with English-language translation (four (4) pages).

German-language Written Opinion (PCT/ISA/237) issued in PCT Application No. PCT/EP2014/071615 dated Jan. 20, 2015 (ten (10) pages).

Russian Office Action issued in counterpart Russian Application No. 2016118149/11(028491) dated Jul. 6, 2017 with unverified English translation (13 pages).

* cited by examiner

| | 2/2 directional valve 12 | 3/2 directional solenoid valve 13 | 2/2 directional valve 11 | Pressure p4 | Relay valve 5 | Pressure p3 | Condition |
|---|---|---|---|---|---|---|---|
| 000 | Pass-through | Pressure build-up | Pass-through | Build-up | Build-up | Build-up | p21,22 > p3,4 |
| 001 | Pass-through | Pressure build-up | Blocking | Build-up | Build-up | Holding | p21 > p4 |
| 010 | Pass-through | Pressure dissipation | Pass-through | Dissipation | Dissipation | Dissipation | p21,22 < p3,4 |
| 011 | Pass-through | Pressure dissipation | Blocking | Dissipation | Dissipation | Holding | p21 < p4 |
| 100 | Blocking | Pressure build-up | Pass-through | Holding | Build-up | Build-up | p22 > p3 |
| 101 | Blocking | Pressure build-up | Blocking | Holding | Build-up | Holding | Forced holding or build-up priority |
| 110 | Blocking | Pressure dissipation | Pass-through | Holding | Dissipation | Dissipation | p22 < p3 |
| 111 | Blocking | Pressure dissipation | Blocking | Holding | Dissipation | Holding | Forced holding or dissipation priority |

FIG. 7

METHOD FOR CONTROLLING A PRESSURE CONTROL DEVICE OF A PRESSURE-MEDIUM BRAKE SYSTEM OF A VEHICLE

CROSS REFERENCE TO RELATED APPLICATIONS

This application is a continuation of PCT International Application No. PCT/EP2014/071615, filed Oct. 11, 2014, which claims priority under 35 U.S.C. § 119 from German Patent Application No. 10 2013 016 877.5, filed Oct. 11, 2013, the entire disclosures of which are herein expressly incorporated by reference.

BACKGROUND AND SUMMARY OF THE INVENTION

The invention relates to a method for controlling a pressure control device of a pressure-medium-type brake system of a vehicle.

A method of said type or a pressure control device of said type is known from German patent document no. DE 10 2010 010 606 A1. The known pressure control device is constructed such that, proceeding from a brake slip regulation (ABS) arrangement as a basis, said pressure control device can be easily enhanced in terms of its regulation functions merely through the addition of individual components, for example for enhancement to include drive slip regulation (ASR), driving dynamics regulation (ESP) or an electronic brake system (EBS).

The known pressure control device comprises a single relay valve, having a reservoir port which is supplied from a reservoir pressure, having a deaeration port which is connected to a pressure sink, having a control port, and having at least two working ports, wherein one working port is assigned to at least one brake cylinder of a wheel of one vehicle side of the axle, and the other working port of the single relay valve is assigned to at least one brake cylinder of a wheel of the other vehicle side of the axle. Each working port of the relay valve is connected to a 2/2 directional valve which is controlled directly or indirectly by a control unit and which is assigned to in each case one vehicle side and which, in a manner dependent on the actuation by the control unit, either produces a connection between the respective working port of the relay valve and the associated brake cylinder or shuts off said connection, and wherein the control port of the relay valve is, by way of a valve device which is formed by a 3/2 directional solenoid valve or by two 2/2 directional solenoid valves and which is controlled by way of the control unit, connectable either to a brake control pressure formed dependently on a driver braking demand, or to a pressure sink.

Thus, the known pressure control device comprises just four basic elements: the single relay valve, the valve device, which comprises only one 3/2 directional solenoid valve or two 2/2 directional solenoid valves, and the two 2/2 directional valves. By means of these valves, which are relatively easy and inexpensive to produce, it is already possible to realize wheel-specific brake slip regulation to a certain extent, that is to say for example a pressure build-up or pressure dissipation at a wheel brake cylinder of one vehicle side with simultaneous holding of a pressure in a wheel brake cylinder of the other vehicle side. An opposite pressure profile (pressure dissipation, pressure build-up) at wheels on different vehicle sides is however not possible.

In particular, only a single relay valve is used in order to realize wheel-specific control of large pressure medium cross sections in the brake cylinders inter alia by way of a central, relatively small control pressure flow. In this way, the pressure control device is, altogether, very inexpensive to produce.

In the control of the known pressure control device, however, the problem arises that, owing to the relatively inert reaction of the relay valve to pneumatic pressure control signals introduced through its control port, a situation may for example arise in which compressed air continues to flow into a brake cylinder despite the fact that a pressure dissipation is already sought there in a manner commanded, for example, by a wheel-specific brake slip regulation (ABS) arrangement. This is disadvantageous in particular with regard to a demanded fast pressure adaptation of the brake pressures in the brake cylinders in the context of a brake slip regulation (ABS) arrangement, a drive slip regulation (ASR) arrangement or a driving dynamics regulation (ESP) arrangement.

The invention is accordingly based on the object of further developing a method for the control of a pressure control device mentioned in the introduction such that said method permits faster adaptation of the brake cylinder pressures.

DISCLOSURE OF THE INVENTION

The invention is based on the concept that, for a pressure dissipation at at least one brake cylinder, the valve device is switched into the pressure dissipation position, and the 2/2 directional valve assigned to the respective brake cylinder is switched into or remains in a blocking position for as long as the working pressure at the working port assigned to the at least one brake cylinder, remains higher than or equal to the pressure in the respective brake cylinder, and the 2/2 directional valve assigned to the respective brake cylinder is switched into the pass-through position only when the working pressure at the respective working port of the relay valve is lower than the pressure in the respective brake cylinder, and that, for a pressure build-up at at least one brake cylinder, the valve device is switched into the pressure build-up position, and the 2/2 directional valve assigned to the respective brake cylinder is switched into or remains in a blocking position for as long as the working pressure at the working port assigned to the at least one brake cylinder remains lower than or equal to the pressure in the respective brake cylinder, and the 2/2 directional valve assigned to the respective brake cylinder is switched into the pass-through position only when the working pressure at the respective working port of the relay valve is higher than the pressure in the respective brake cylinder.

The method according to the invention prevents the problem highlighted in the introduction, whereby, owing to the relatively inert reaction of the relay valve to pneumatic pressure control signals introduced through its control port, a situation for example arises in which compressed air continues to flow into a brake cylinder despite the fact that a pressure dissipation is already sought there in a manner commanded, for example, by a wheel-specific brake slip regulation arrangement.

This is because, in the case of the invention, preferably at all times or in time periods in which a pressure adaptation takes place in at least one brake cylinder, the working pressures prevailing at the working ports of the relay valve are compared with the brake cylinder pressures prevailing in each case in the brake cylinders.

If said comparison yields that a permitted pressure gradient between the working pressure at the respective working port of the relay valve and the brake cylinder pressure of the respective brake cylinder is present, for example in the case of a pressure build-up at a brake cylinder, in the case of which the working pressure at the respective working port must then be greater than the brake cylinder pressure in the respective brake cylinder, the 2/2 directional valve assigned to the brake cylinder is immediately switched into the pass-through position.

However, if said comparison yields that a permitted pressure gradient does not exist between the working pressure at the respective working port of the relay valve and the brake cylinder pressure of the respective brake cylinder, and therefore, for the exemplary situation of the pressure build-up at a brake cylinder, the working pressure at the respective working port of the relay valve is still lower than or equal to the brake cylinder pressure in the respective brake cylinder, the 2/2 directional valve assigned to the brake cylinder is switched from the blocking position into the pass-through position only after the expiration of a blocking holding time, which is necessary owing to inertia in order that the working pressure at the respective working port of the relay valve can rise to the desired setpoint pressure value.

The method proceeds analogously in the case of a pressure dissipation, wherein then, a permitted pressure gradient between the working pressure at the respective working port of the relay valve and the brake cylinder pressure of the respective brake cylinder must exist whereby the working pressure of the respective working port must be lower than the brake cylinder pressure in the respective brake cylinder. If this is the case, the 2/2 directional valve assigned to the brake cylinder is immediately switched into the pass-through position.

However, if said comparison yields that a permitted pressure gradient does not exist between the working pressure at the respective working port of the relay valve and the brake cylinder pressure of the respective brake cylinder, and therefore, for the exemplary situation of the pressure dissipation at a brake cylinder, the working pressure at the respective working port of the relay valve is still higher than or equal to the brake cylinder pressure in the respective brake cylinder, the 2/2 directional valve assigned to the brake cylinder is switched from the blocking position into the pass-through position only after the expiration of a blocking holding time, which is necessary owing to inertia in order that the working pressure at the respective working port of the relay valve can fall to the desired setpoint pressure value.

The method according to the invention is used both for a wheel-specific pressure build-up and for a wheel-specific pressure dissipation and for a pressure build-up and pressure dissipation in the brake cylinders of both wheels of the axle.

It is preferable for pressure in the respective brake cylinder and/or the working pressure at the respective working port of the relay valve to be measured by way of a pressure sensor or estimated by way of an estimation algorithm.

It is also preferable for a pressure build-up or a pressure dissipation at the first brake cylinder to firstly be fully completed before a pressure build-up or a pressure dissipation at the second brake cylinder is commenced, and vice versa.

In one refinement, the valve device is actuated in pulse-width-modulated fashion for the pressure build-up or pressure dissipation. This yields fast switching of the valve device between the aeration position and the deaeration position, whereby a suspension pressure is generated in the control chamber, which is connected to the control port of the relay valve, which improves the reaction time of the relay valve.

In a preferred refinement, the valve device is, in a basic position, actuated into the pressure dissipation position or into the pressure build-up position. The background to this measure lies in the fact that, for example in the event of undesired locking of a wheel, it is necessary, in the context of a brake slip regulation (ABS) arrangement, drive slip regulation (ASR) arrangement or driving dynamics regulation (ESP) arrangement, for the brake pressure in the respective brake cylinder or in the respective brake cylinders to be dissipated very rapidly. Here, it is advantageous for a valve device to already be situated in the pressure dissipation position, because said valve device then no longer needs to be switched. The basic position of the valve device is therefore, in a prioritized manner, the pressure dissipation position. On the other hand, the basic position of the valve device may also be formed, in a prioritized manner, by the pressure build-up position, if a desired pressure build-up is predictable.

In general, the pressure build-up or the pressure dissipation at at least one of the brake cylinders may be performed in a manner commanded by a wheel-specific brake slip regulation (ABS) arrangement, a wheel-specific drive slip regulation (ASR) arrangement, by a wheel-specific driving dynamics regulation (ESP) arrangement or by any other desired control or regulation arrangement.

It is preferable, as 2/2 directional valves, for use to be made of diaphragm valves or booster valves which are pneumatically pilot-controlled by in each case one 3/2 directional pilot control solenoid valve which is electrically controlled by the control unit and assigned to the same vehicle side. In this way, it is possible for large pressure medium flows to be introduced into the brake cylinders relatively quickly by way of small control pressure medium flows.

Here, the 3/2 directional pilot control solenoid valves are preferably designed such that, in a manner dependent on control by the control unit, they, on the one hand, pass through a reservoir pressure of a pressure reservoir, or the control pressure formed dependently on a driver braking demand, to a control port of the associated 2/2 directional valve, or on the other hand, connect said control port to a pressure sink.

The situation in which the 3/2 directional pilot control solenoid valves pass through the control pressure, based on a driver braking demand, to the control port of the associated 2/2 directional valve yields the advantage that, if, during a driver-initiated braking operation, the ABS is in a pressure-holding phase and the driver releases the brake pedal during said pressure-holding phase, the control pressure based on a driver braking demand falls, and therefore the associated 2/2 directional valve which was closed during the pressure-holding phase can open in order to dissipate brake pressure (pressure reduction or pressure dissipation). In this way, the driver exerts greater influence, and can "override" the ABS functions.

In the other situation, if the 3/2 directional pilot control solenoid valves pass through the reservoir pressure of the pressure reservoir to the control port of the associated 2/2 directional valve, a release of the brake pedal during a pressure-holding phase of the ABS would not lead to a reduction of the brake pressure in the brake cylinder. This would be possible only during the next ABS cycle (pressure reduction or pressure dissipation), but without the possibility of intervention by the driver.

Here, the control unit is designed such that, by way of control of at least the valve device and the 2/2 directional valves assigned in each case to one vehicle side, wheel-specific brake slip regulation in the context of the typical ABS functions of pressure build-up, pressure holding and pressure dissipation is realized in order to achieve optimum wheel slip.

Proceeding from this ABS-capable basic layout, in order to realize drive slip regulation (ASR), the valve device interacts with only a single solenoid valve, which is electrically controlled by the control unit, such that the control port of the single relay valve is, in a manner dependent on the drive slip of the wheels of the axle, connected to the control pressure formed dependently on a driver braking demand, to a reservoir pressure of a pressure reservoir, or to a pressure sink.

The ABS-capable basic layout of the pressure control device is advantageously therefore supplemented by just a single solenoid valve in order to additionally realize wheel-specific drive slip regulation (ASR). Here, the single additional solenoid valve is preferably a 3/2 directional solenoid valve, if the valve device is likewise formed by merely a 3/2 directional solenoid valve.

In this case, the control unit is designed such that, aside from the ABS functions, wheel-specific drive slip regulation (ASR) is also realized by way of control at least of the single additional solenoid valve.

However, if the valve device comprises two 2/2 directional solenoid valves, then a first 2/2 directional solenoid valve is preferably an outlet valve which either connects, in a pressure dissipation position, the control port of the single relay valve to a pressure sink or blocks said connection, and a second 2/2 directional solenoid valve is in particular a valve also usable as a backup valve of an EBS, which valve either connects, in a pressure build-up position, the control port of the single relay valve to the control pressure formed dependently on a driver braking demand, or blocks said connection. The single additional solenoid valve provided for the realization of the drive slip regulation of the axle is in this case an inlet valve in the form of a 2/2 directional solenoid valve.

By way of the inlet valve, the outlet valve and the backup valve, it is then possible to form not only a drive slip regulation arrangement but also an electronic brake system (EBS) with primary electropneumatic brake circuit and secondary pneumatic brake circuit, which furthermore comprises at least one pressure sensor which is connected in pressure-conducting fashion to at least one working port of the single relay valve.

For this purpose, the ABS-capable basic layout with a valve device composed of two 2/2 directional solenoid valves (outlet valve, backup valve) is, for the control of the single relay valve, supplemented by just one inlet valve in the form of a 2/2 directional solenoid valve, in order to form, together with at least one pressure sensor and a suitably programmed control unit, a complete electronic brake system (EBS) including drive slip regulation for the respective axle.

In this case, the control unit is designed such that, aside from implementing the ABS and ASR functions, it also adapts, by way of control of the inlet valve and of the outlet valve, the actual brake pressure measured by the at least one pressure sensor to a setpoint brake pressure formed dependently on a driver braking demand, in the context of a brake pressure regulation arrangement.

To form a driving dynamics regulation ESP arrangement, just one further pressure sensor is provided for measuring the control pressure based on a driver braking demand. Then, in the vehicle, at least one pressure control device of the described type is assigned to each axle. The ESP enhances the ABS/ASR regulation to include the variables of vehicle movement, that is to say to include the transverse dynamics, by forming a corrective yaw moment in the event of oversteering or understeering. Said corrective yaw moment is then converted into wheel slip by braking individual wheels or multiple wheels by way of the pressure control device according to the invention.

For example, the control device is designed such that, in the event of a braking operation initiated by the driving dynamics regulation ESP arrangement, said control device controls at least the valve device and the single additional solenoid valve such that the control port of the relay valve is, in a manner dependent on the yaw rate of the vehicle, charged with the reservoir pressure of the pressure reservoir, the 2/2 directional valve assigned to the first brake cylinder of the first vehicle side is switched into the pass-through position, and the 2/2 directional valve assigned to the second brake cylinder of the second vehicle side is switched into the blocking position.

Altogether, the various expansion levels differ from the ABS-capable basic layout by just a single valve in order to additionally realize an ASR function, an EBS, or an EBS with driving dynamics regulation ESP. This yields a modular construction of the pressure control device, without the expansion level that is relatively simple in terms of scope having to be changed in terms of its construction in order to be able to integrate the additional valve into the construction.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 7 shows a table illustrating various switching states of valves of the pressure control device as per an embodiment of the present invention;

DETAILED DESCRIPTION OF THE DRAWINGS

Figure 1:
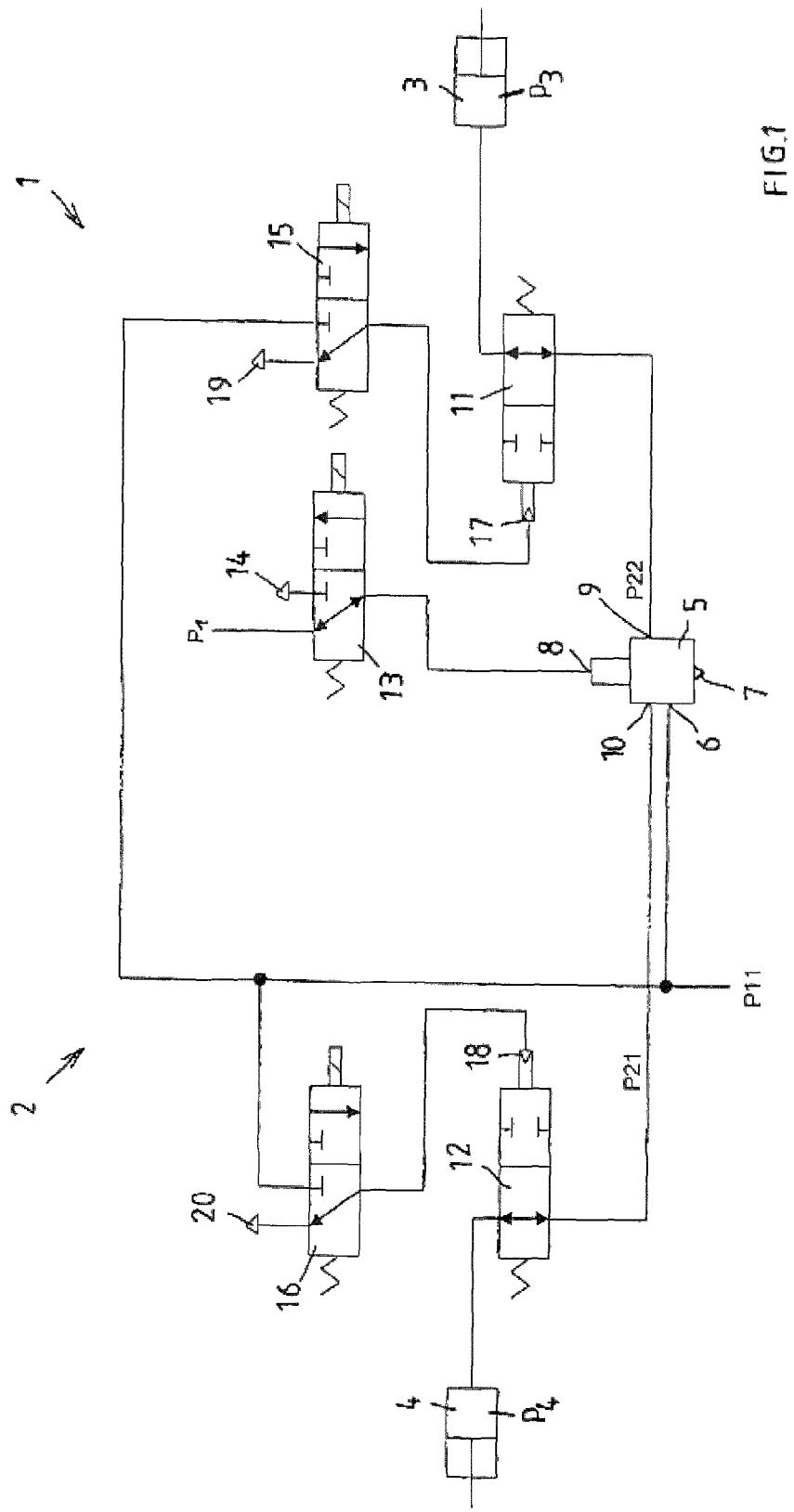
FIG. 1 shows a circuit diagram of a pressure control device of a pneumatic vehicle brake system with ABS, as per a preferred embodiment of the present invention.

In FIG. 1, the reference numeral 1 denotes a preferred embodiment of a pressure control device, which comprises a valve unit 2 and an electronics unit, connected mechanically and electrically directly to said valve unit, as a control unit, which in this case is not illustrated for reasons of scale. The pressure control device 1 is, in the preferred embodiment, integrated into a compressed-air brake system of a utility vehicle.

The pressure control device 1 is designed for the wheel-specific, at least brake-slip-dependent control of brake pressures in brake cylinders 3, 4 of wheels of a driven axle, for example. For this purpose, said pressure control device comprises a single relay valve 5, having a reservoir port 6 which is supplied from a reservoir pressure P11, having a deaeration port 7 which is connected to a pressure sink, having a control port 8, and having two working ports 9, 10.

Here, a first working port 9 is assigned to a first brake cylinder 3 of a wheel of a first vehicle side of the axle, and a second working port 10 of the single relay valve 5 is assigned to a second brake cylinder 4 of the wheel of the second vehicle side of the axle, in order to be able to generate a first brake pressure $P_3$ in the first brake cylinder 3 and/or a second brake pressure $P_4$ in the second brake cylinder 4. Furthermore, each working port 9, 10 of the relay valve 5 is connected to a 2/2 directional valve 11, 12 which is preferably indirectly controlled by the control unit and which is assigned to in each case one vehicle side.

The 2/2 directional valves 11, 12, in a manner dependent on in this case preferably indirect actuation by the control unit, either produce a connection between the respective working port 9, 10 of the relay valve 5 and the associated brake cylinder 3, 4, or block said connection.

In the embodiment of FIG. 1, by way of a valve device which is formed by for example a 3/2 directional solenoid valve 13 and which is controlled by way of the control unit, the control port 8 of the relay valve is connectable either to a brake control pressure $P_1$ based on a driver braking demand, or to a pressure sink 14. The 3/2 directional solenoid valve 13 is preferably spring-loaded and thereby preloaded, in a deenergized state, into the switching position in which it connects the control port 8 of the relay valve 5 to the brake control pressure $P_1$ based on a driver braking demand. By contrast, in the energized state, the control port 8 of the relay valve 5 is connected to the pressure sink 14.

The brake control pressure $P_1$ based on a driver braking demand is in this case generated for example by a driver-actuated footbrake module (not shown here).

The 2/2 directional valves 11, 12 are particularly preferably pneumatically controllable diaphragm valves which are preferably pneumatically pilot-controlled by way of in each case one 3/2 directional pilot control solenoid valve 15, 16, which is electrically controlled by the control unit and assigned to the same vehicle side. Here, the 3/2 directional pilot control solenoid valves 15, 16 are preferably formed such that, in a manner dependent on control by the control unit, they pass through the reservoir pressure P11 of the pressure reservoir to a control port 17, 18 of the associated 2/2 directional valve 11, 12 or, on the hand, connect said control port 17, 18 to a pressure sink 19, 20. The 3/2 directional pilot control solenoid valves 15, 16 are preferably spring-loaded and thereby preloaded, in a deenergized state, into the switching position in which they connect the control port 17, 18 of the associated 2/2 directional valve 11, 12 to the pressure sink. By contrast, in the energized state, the control ports 17, 18 of the 2/2 directional valves 11, 12 are connected to the pressure sink 19, 20.

Here, the control unit is designed such that, by way of control of the 3/2 directional solenoid valve 13 and of the two 3/2 directional pilot control solenoid valves 15, 16 for the indirect control of the 2/2 directional valves 11, 12, wheel-specific brake slip regulation in the context of the typical ABS functions of pressure build-up, pressure holding and pressure dissipation is realized in order to achieve optimum setpoint brake slip. For the calculation of the actual brake slip, the control unit receives information, in a known manner, regarding the wheel rotational speeds of the wheels of the axle from wheel rotational speed sensors (not shown here).

Against this background, the following mode of operation of the pressure control device 1 illustrated in FIG. 1 is realized:

During a normal service braking operation, the central 3/2 directional solenoid valve 13 for the pilot control of the relay valve 5, and the two 3/2 directional pilot control solenoid valves 15, 16, are situated in the spring-actuated deenergized basic position shown in FIG. 1, or are switched into said basic position, such that the 3/2 directional solenoid valve 13 connects the control port 8 of the relay valve 5 to the brake control pressure $P_1$ based on a driver braking demand. Consequently, from said brake control pressure $P_1$, the relay valve 5 modulates a working pressure P21 and P22 at its two working ports 9, 10. Since the two 3/2 directional pilot control solenoid valves 15, 16 are likewise situated in their deenergized basic position, the pneumatic control ports 17, 18 of the two 2/2 directional valves 11, 12 are in each case connected to the pressure sinks 19, 20, such that said 2/2 directional valves are situated in the pass-through position shown in FIG. 1 in order to introduce the working pressure P21 and P22 prevailing at the working ports 9, 10 of the relay valve 5 into the brake cylinders 3, 4, from which working pressure the two brake pressures $P_3$ and $P_4$ are then obtained. The working pressures P21 and P22 for the first vehicle side and the second vehicle side are in this case substantially equal.

During an ABS or brake-slip-regulated braking operation with a locking tendency only on one side, for example at the wheel assigned to the second brake cylinder 4, the 3/2 directional solenoid valve 13 is initially energized and thereby switched into its deaeration position, in which the control port 8 of the relay valve 5 is connected to the pressure sink 14. In this way, both working ports 9, 10 of the relay valve 5 are connected to its pressure sink 7. Furthermore, on the vehicle side on which no wheel locking occurs, for example at the wheel assigned to the first brake cylinder 3, the 3/2 directional pilot control solenoid valve 15 is, by energization by the control unit, switched into the position in which the control port 17 of the respective 2/2 directional valve is charged with the reservoir pressure P11. In this way, the 2/2 directional valve 11 switches into its blocking position and thereby holds the brake pressure $P_3$ in the first brake cylinder 3 of the non-locking wheel (pressure holding).

By contrast, on the second vehicle side, on which wheel locking has been detected, the 3/2 directional pilot control solenoid valve 16 is not switched over by the control unit, but rather remains in its deenergized basic position, in which the control port 18 of the respective 2/2 directional valve 12 remains switched to the pressure sink 20. In this way, the 2/2 directional valve 12 remains in its pass-through position shown in FIG. 1, whereby the brake pressure $P_4$ in the brake cylinder 4 of the locking wheel can dissipate via the pressure sink 7 of the relay valve 5 (pressure dissipation).

In the exemplary embodiments of FIG. 2 to FIG. 6, those parts which remain the same in relation to the FIG. 1 embodiment, and parts of similar action, are denoted by the same reference numerals.

Figure 2:
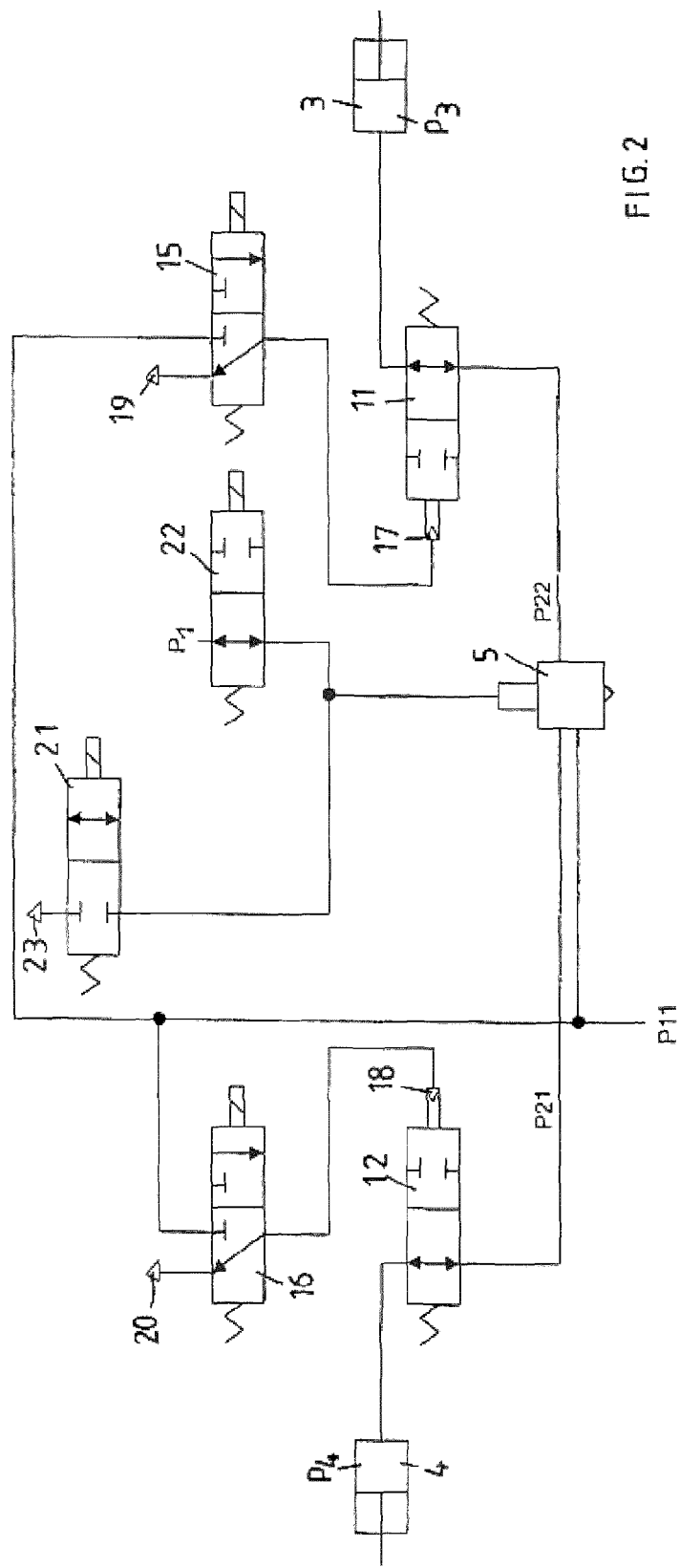
FIG. 2 shows a circuit diagram of a pressure control device of a pneumatic vehicle brake system with ABS, as per a further embodiment of the present invention.

In the embodiment of FIG. 2, the valve device is composed not of a single 3/2 directional solenoid valve but of two 2/2 directional solenoid valves 21, 22, wherein a first 2/2 directional solenoid valve 21, as outlet valve, either connects, in a pressure dissipation position, the control port 8 of the relay valve 5 to a pressure sink 23, or blocks said connection, as shown. On the other hand, a second 2/2 directional solenoid valve 22 either connects, in a pressure build-up position, the control port 8 of the relay valve 5 to the brake control pressure $P_1$ formed dependently on a driver braking demand, or blocks said connection. Both 2/2 directional solenoid valves 21, 22 are switched in spring-loaded fashion into their basic position shown in FIG. 2, in which the first 2/2 directional solenoid valve 21 is switched into the blocking position and the second 2/2 directional solenoid valve 22 is switched into the pass-through position.

Against this background, the following mode of operation of the pressure control device 1 illustrated in FIG. 2 is realized:

During a normal service braking operation, the first 2/2 directional solenoid valve 21 is situated in the deenergized blocking position, whereas the second 2/2 directional solenoid valve 22 is situated in the pass-through position. Furthermore, the two 3/2 directional pilot control solenoid valves 15, 16 are also situated in the spring-actuated deenergized basic position shown in FIG. 2, such that the other 2/2 directional solenoid valve 22 connects the control port 8 of the relay valve 5 to the brake control pressure $P_1$ formed dependently on a driver braking demand, as shown in FIG. 2. As described above, from said brake control pressure $P_1$, the relay valve 5 modulates a working pressure P21 and P22 at its two working ports 9, 10. Since the two 3/2 directional pilot control solenoid valves 15, 16 are likewise situated in their deenergized basic position, the pneumatic control ports 17, 18 of the two 2/2 directional valves 11, 12 are in each case connected to the pressure sinks 19, 20, such that said 2/2 directional valves are situated in the pass-through position shown in FIG. 2 in order to introduce the working pressure P21 and P22 prevailing at the working ports 9, 10 of the relay valve 5 into the brake cylinders 3, 4 as brake pressures $P_3, P_4$. The working pressures P21 and P22 for the first vehicle side and the second vehicle side are in this case substantially equal.

During an ABS or brake-slip-regulated braking operation with a locking tendency only on one side, the first 2/2 directional solenoid valve 21, as outlet valve, is energized and thereby switched into its pass-through position, in which the control port 8 of the relay valve 5 is connected to the pressure sink 23, in the pressure dissipation position. The second 2/2 directional solenoid valve 22 is also energized, and thereby switched into its blocking position, whereby the control port 8 of the relay valve 5 is decoupled from the brake control pressure $P_1$. In this way, both working ports 9, 10 of the relay valve 5 are connected to its pressure sink 7. The switching of the two 3/2 directional pilot control solenoid valves 15, 16 is performed as described in the exemplary embodiment above, such that the 2/2 directional valve 11 of the non-locking vehicle side is switched into its blocking position, whereby the first brake pressure $P_3$ in the first brake cylinder 3 of the non-locking wheel is held (pressure holding). By contrast, on the second vehicle side, on which wheel locking has been detected, the 3/2 directional pilot control solenoid valve 16 is not switched over by the control unit, but rather remains in its deenergized basic position, in which the control port 18 of the respective 2/2 directional valve 12 remains switched to the pressure sink 20. In this way, the 2/2 directional valve 12 remains in its pass-through position shown in FIG. 2, whereby the second brake pressure P21 or the second brake pressure $P_4$ in the second brake cylinder 4 of the locking wheel can dissipate via the pressure sink 7 of the relay valve 5 (pressure dissipation).

Figure 3:
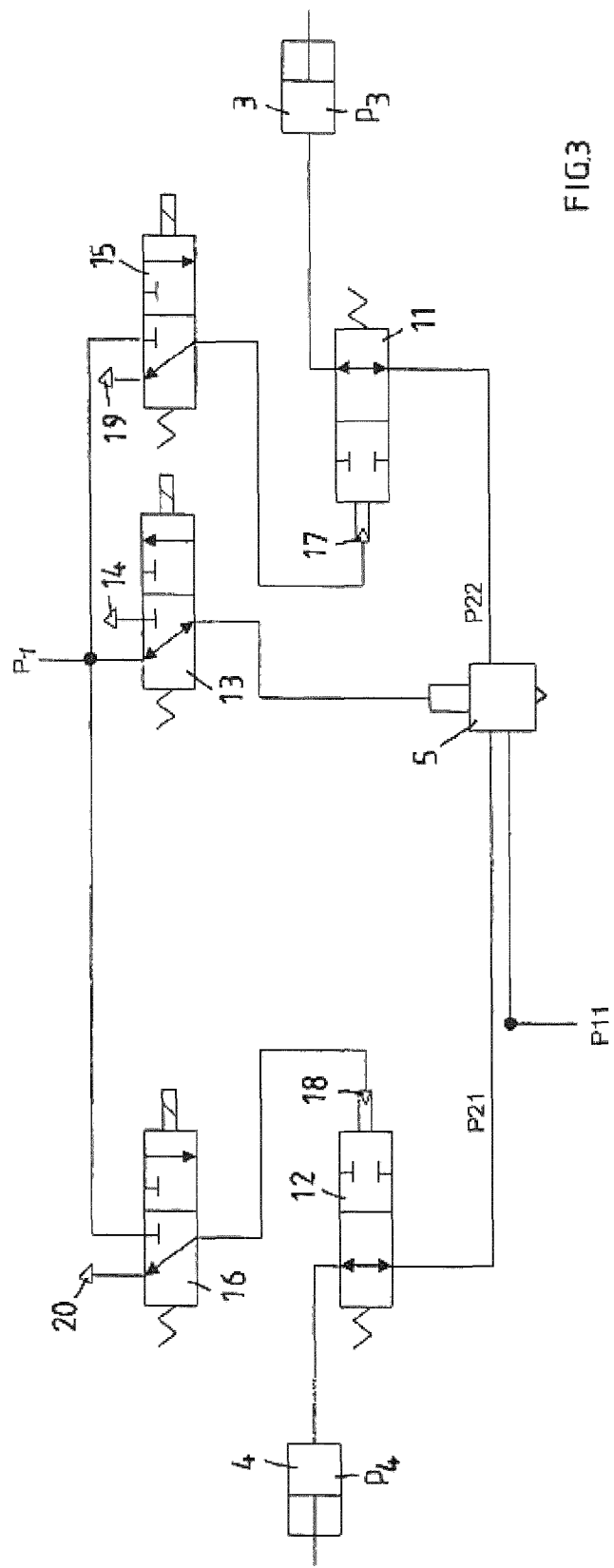
FIG. 3 shows a circuit diagram of a pressure control device of a pneumatic vehicle brake system with ABS, as per a further embodiment of the present invention.

In the embodiment of FIG. 3, by contrast to the embodiments as per FIG. 1 and FIG. 2, it is not a reservoir pressure P11 of a pressure reservoir but the brake control pressure p1 formed dependently on a driver braking demand that is switched by way of the two 3/2 directional pilot control solenoid valves 15, 16 to the control ports 17, 18 of the 2/2 directional valves 11, 12. Then, if the ABS, during a driver-initiated braking operation, is in a pressure-holding phase, and the driver releases the brake pedal during said pressure-holding phase, the control pressure $P_1$ based on a driver braking demand decreases, such that the associated 2/2 directional valve 11 or 12 that is closed during the pressure-holding phase can open in order to dissipate the first brake pressure $P_3$ or the second brake pressure $P_4$ respectively (pressure dissipation).

Figure 4:
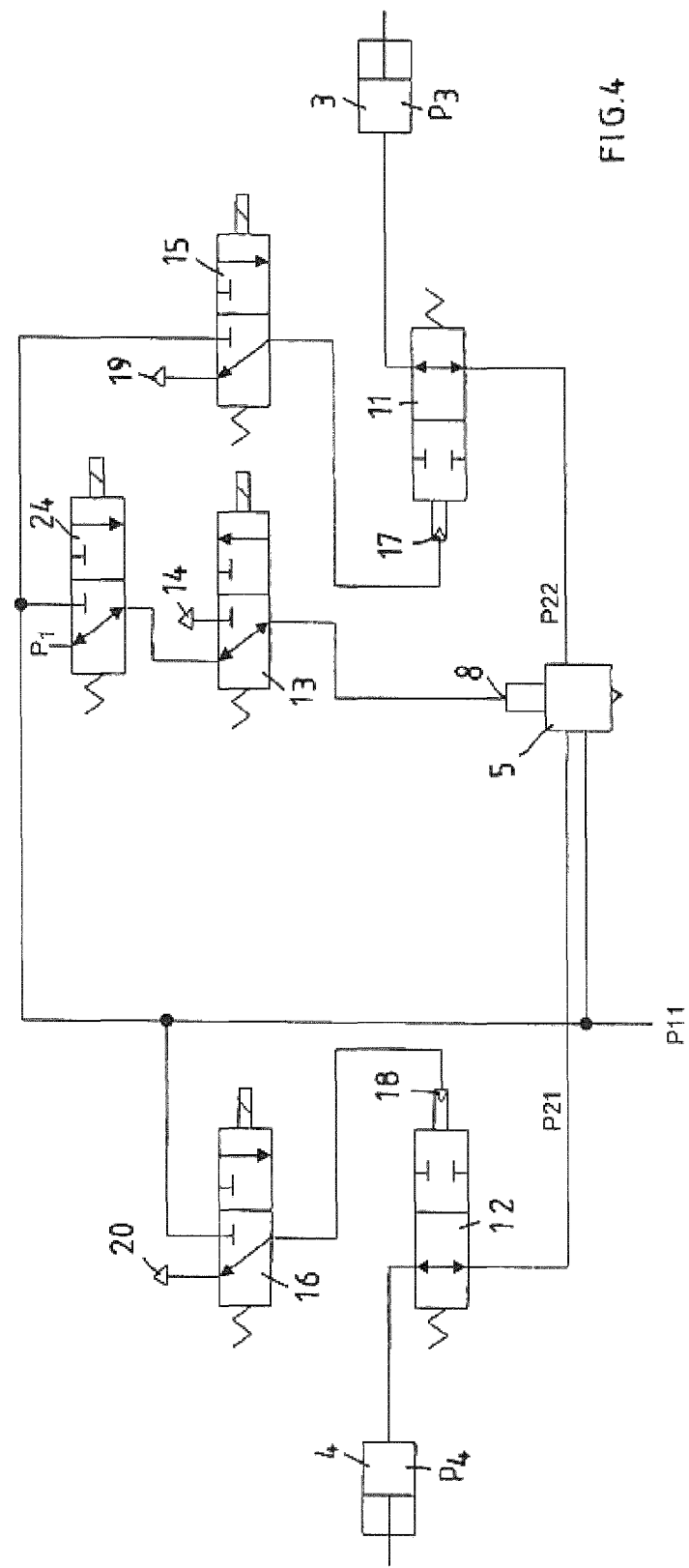
FIG. 4 shows a circuit diagram of a pressure control device of a pneumatic vehicle brake system with ABS and ASR, as per a further embodiment of the present invention.

The ABS-capable basic layout as per FIG. 1 to FIG. 3 is, in order to realize drive slip regulation (ASR), supplemented by just one solenoid valve 24, as per the embodiment of FIG. 4, which is electrically controlled by the control unit. Said solenoid valve 24 then interacts with the valve device 13 such that the control port 8 of the single relay valve 5 is, in a manner dependent on the drive slip of the wheels of the axle, connected to the control pressure $P_1$ formed dependently on a driver braking demand, to the reservoir pressure P11 of the pressure reservoir, or to a pressure sink 14. Here, the single additional solenoid valve is preferably a 3/2 directional solenoid valve 24, and the valve device is, analogously to FIG. 1, likewise formed by a 3/2 directional solenoid valve 13.

In this case, the control unit is designed such that, aside from the ABS functions, wheel-specific drive slip regulation (ASR) is also realized by way of control at least of the additional 3/2 directional solenoid valve 24. Said additional 3/2 directional solenoid valve 24 is, at the control side of the relay valve 5, connected upstream of the 3/2 directional solenoid valve 13 forming the valve device. Said additional 3/2 directional solenoid valve 24, in its spring-loaded, deenergized basic position, connects the control pressure $P_1$ formed dependently on a driver braking demand through to the 3/2 directional solenoid valve 13, and in its energized switching position, connects the reservoir pressure P11 through to the 3/2 directional solenoid valve 13. In the energized switching position of the 3/2 directional solenoid valve 24, slip regulation is performed by way of the valves 13, 15 and 16 in accordance with the wheel drive slip.

If no excessive drive slip occurs at the two wheels of the axle, the additional ASR valve 24 connects the control pressure $P_1$ formed dependently on a driver braking demand through to the 3/2 directional solenoid valve 13, whereby the control port 8 of the relay valve 5 is, as described with regard to the exemplary embodiment of FIG. 1, aerated or deaerated in accordance with whether the control pressure $P_1$ based on a driver braking demand represents a brake-release control pressure or a brake-application control pressure. Here, if the additional ASR valve 24 is deactivated, the holding valves 11, 12 automatically open by way of corresponding actuation by the valves 15, 16. In the case of a brake-release control pressure $P_1$, that is to say when the footbrake valve is not actuated, the relay valve 5 outputs only a low working pressure P21 and P22 at its working ports 9, 10 respectively, such that both wheel brake cylinders 3, 4 are released.

By contrast, in the presence of inadmissible drive slip, the additional ASR valve 24 connects the reservoir pressure P11 through to the 3/2 directional solenoid valve 13, which in this regard is switched into the pass-through position, whereby the control port 8 of the relay valve 5 is aerated with a brake-application control pressure, and said relay valve therefore outputs a brake-application pressure at its working ports 9, 10. The switching positions of the 3/2 directional pilot control solenoid valves 15, 16 and of the two 2/2 directional valves 11, 12 are then as shown in FIG. 4, such that the wheel brake cylinders 3, 4 of the axle are, in the presence of inadmissible wheel slip, temporarily applied in the context of wheel slip regulation.

Figure 5:
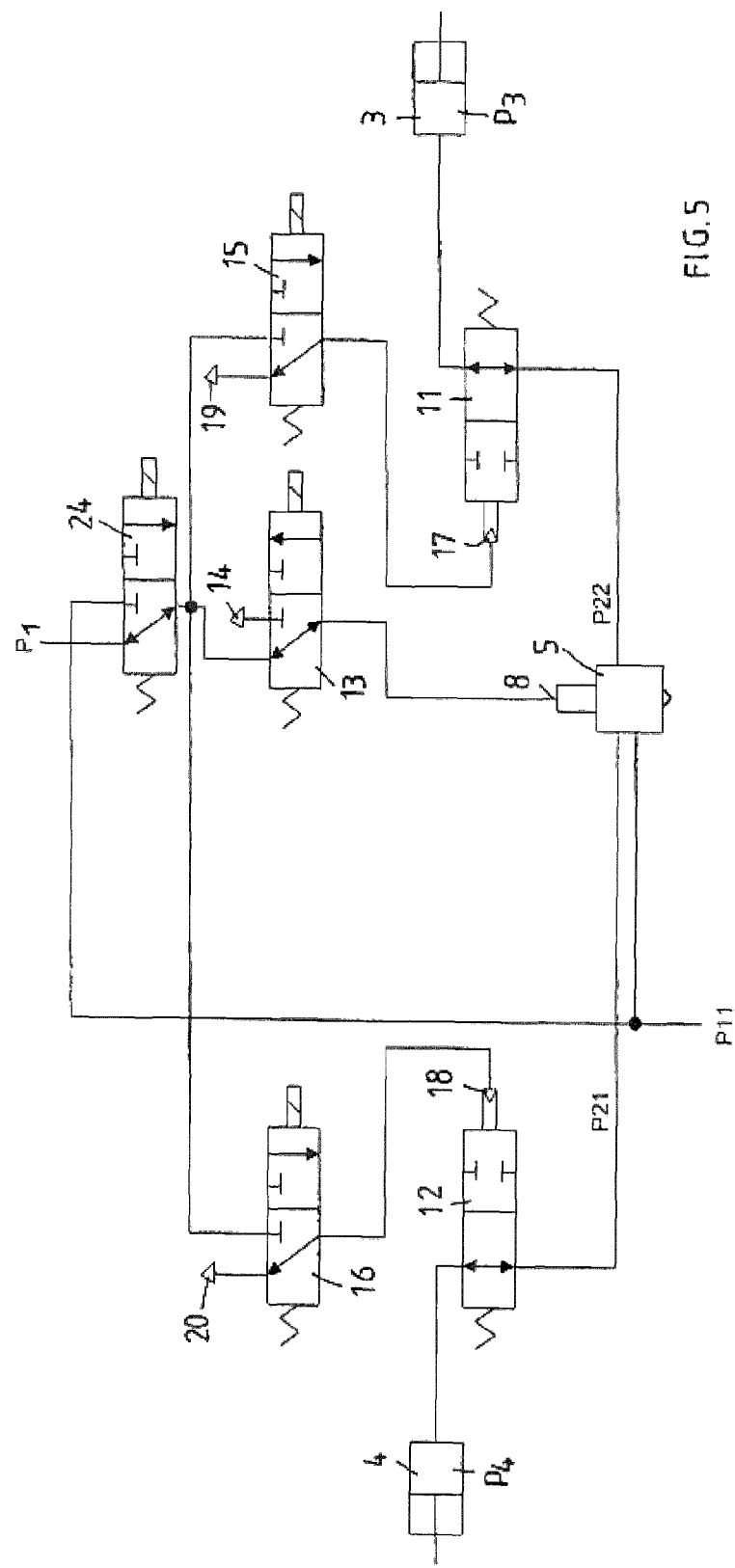
FIG. 5 shows a circuit diagram of a pressure control device of a pneumatic vehicle brake system with ABS and ASR, as per a further embodiment of the present invention.

In an alternative embodiment to this as per FIG. 5, it is the case, as in the embodiment of FIG. 2, that not the reservoir pressure P11 of the pressure reservoir but the brake control pressure $P_1$ formed dependently on a driver braking demand that is connected through, by way of the two 3/2 directional pilot control solenoid valves 15, 16, to the control ports 17, 18 of the two 2/2 directional valves 11, 12. Then, if the ASR is in a pressure-holding phase and the driver actuates the brake pedal during said pressure-holding phase, the control pressure $P_1$ formed dependently on a driver braking demand increases, such that the associated 2/2 directional valve 11 or 12 that is closed during the pressure-holding phase can open in order to build up brake pressure P21 or P22 respectively (pressure build-up).

Figure 6:
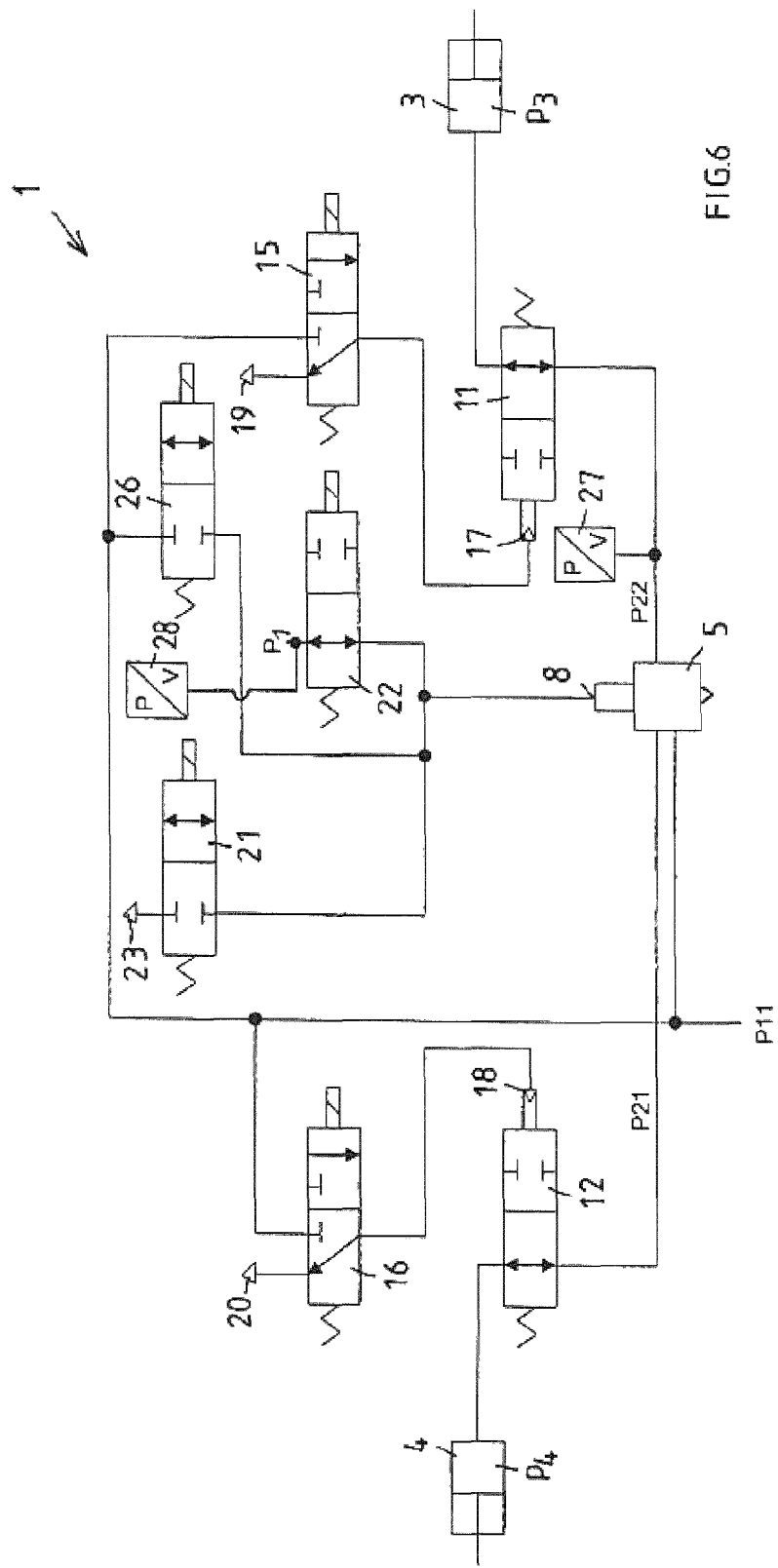
FIG. 6 shows a circuit diagram of a pressure control device of a pneumatic vehicle brake system, in the form of an electronic brake system EBS, with ABS/ASR and ESP functionalities, as per a further embodiment of the present invention.

If the valve device comprises not a 3/2 directional solenoid valve 13 but two 2/2 directional solenoid valves 21, 22 as per FIG. 3 and FIG. 6, one 2/2 directional solenoid valve 21 is preferably an outlet valve which either connects the control port 8 of the relay valve 5 to its pressure sink 23, or blocks said connection. The second 2/2 directional solenoid valve 22 is in particular a valve that can also be utilized as a backup valve of an EBS, which valve either connects the control port 8 of the relay valve 5 to the control pressure p1 formed dependently on a driver braking demand, or blocks said connection. The single additional solenoid valve provided for realizing the drive slip regulation of the axle is, in the embodiment of FIG. 6, preferably an inlet valve 26 in the form of a 2/2 directional solenoid valve.

As per FIG. 6, the inlet valve 26, the first 2/2 directional solenoid valve 21 as outlet valve and the backup valve 22 then form not only a brake slip regulation (ABS) arrangement and a drive slip regulation (ASR) arrangement but also an electronically regulated brake system (EBS) with primary electropneumatic brake circuit and secondary pneumatic brake circuit, if it is additionally the case, for example, that a working port 9, 10 of the single relay valve 5 is connected in pressure-conducting fashion to a pressure sensor 27.

In this case, the control unit is designed such that, in addition to implementing the ABS and ASR functions, it also, by control of the inlet valve 26 and of the first 2/2 directional solenoid valve 21 as outlet valve, adapts the actual brake pressure measured by the pressure sensor 27 to a setpoint brake pressure formed dependently on a driver braking demand, in the context of brake pressure regulation.

The mode of operation of the EBS is then as follows:

During the course of a normal braking operation, the first 2/2 directional solenoid valve 21, as outlet valve, remains in its spring-loaded blocking position, whereas the inlet valve 26 is switched into the pass-through position in order to aerate the control port 8 of the relay valve 5 with reservoir pressure. This has the effect that working pressure P21 and P22 prevails at the two working ports 9, 10 of the relay valve 5, which are connected through to the wheel brake cylinders 3, 4 by way of the two 2/2 directional valves 11, 12 switched into the pass-through position. The backup valve 22 in this case remains in its energized blocking position, such that the control pressure $P_1$ formed dependently on a driver braking demand, such as prevails at said backup valve, cannot be connected through to the control port 8 of the relay valve 5.

If the electrical brake circuit of the EBS fails, however, the solenoid valves 15, 16, 21, 22, 26 can no longer be energized. Thus, the inlet valve 26 switches back into its deenergized and spring-loaded blocking position, such that reservoir pressure no longer passes to the control port 8 of the relay valve 5. The first 2/2 directional solenoid valve 21, as outlet valve, likewise remains in the blocking position. Then, by way of the backup valve 22 which, in a deenergized state, is switched in spring-loaded fashion into the pass-through position, the control port 8 of the relay valve 8 is charged with the control pressure $P_1$ formed dependently on a driver braking demand, as generated by the footbrake valve, for the purposes of applying the wheel brake cylinders 3, 4.

The ABS and ASR functions then proceed as in the embodiments described above, that is to say the control port 8 of the relay valve 5 is, in a functionally dependent manner, connected by way of the inlet valve 26 to the reservoir pressure P11, by way of the backup valve 22 to the control pressure $P_1$ based on a driver braking demand or is connected to the pressure sink 23 of the outlet valve 21 by way of the first 2/2 directional solenoid valve 21 as outlet valve.

In a further expansion level, in addition to the pressure sensor 27 for measuring the brake pressure P21 and P22, a further pressure sensor 28 is provided for measuring the brake control pressure $P_1$ formed dependently on a driver braking demand. Then, if in each case one pressure control device 1 as per FIG. 6 is provided for each axle, for example for a front axle and for a rear axle, it is possible for a driving dynamics regulation (ESP) arrangement to be realized.

Here, the control unit is designed such that, in the case of a braking operation initiated by the driving dynamics regulation (ESP) arrangement, said control unit controls the first 2/2 directional solenoid valve 21 as outlet valve, the backup valve 22 and the inlet valve 26 such that the control port 8 of the relay valve 5 is charged with the reservoir pressure P11 of the pressure reservoir in a manner dependent on the yaw rate of the vehicle. For this purpose, it is for example the case that the first 2/2 directional solenoid valve 21 as outlet valve and the second 2/2 directional solenoid valve 22 as backup valve are switched into their blocking positions, whereas the inlet valve 26 is switched into the pass-through position in order to aerate the control port 8 of the relay valve 5.

Furthermore, the 3/2 directional pilot control solenoid valves 15, 16 are actuated by the control unit such that, for example, the 2/2 directional valve 11 assigned to the first brake cylinder 3 of the first vehicle side is switched into the pass-through position in order to aerate said first brake cylinder 3, and the 2/2 directional valve 12 assigned to the second brake cylinder 4 of the second vehicle side is switched into the blocking position, in order to shut off said second brake cylinder 4 with respect to the pressure build-up. It is self-evident that, if a yaw moment is to be built up in the opposite direction, the 2/2 directional valve 11 must be switched into the blocking position, and the 2/2 directional valve 12 must be switched into the pass-through position, by way of corresponding actuation of the 3/2 directional pilot control solenoid valves 15, 16.

A pressure control device 1 as described above, and a method as described above for controlling a pressure control device 1 of said type, are known from German patent document no. DE 10 2010 010 606 A1, as cited in the introduction. The present invention is based on the features of the pressure control device 1 known from said document, and on the control thereof, and also encompasses said features and control.

To eliminate the disadvantages, mentioned in the introduction, with regard to the reaction inertia of the relay valve 5, it is proposed that, for a pressure dissipation at at least one brake cylinder 3, 4, the 3/2 directional solenoid valve 13 or the first 2/2 directional valve 21 is switched into the pressure dissipation position, and the 2/2 directional valve 11, 12 assigned to the respective brake cylinder 3, 4 is switched into or remains in a blocking position for as long as the working pressure P21, P22 at the working port 9, 10, assigned to the at least one brake cylinder 3, 4, of the relay valve 5 remains higher than or equal to the pressure $P_3$, $P_4$ in the respective brake cylinder 3, 4, and the 2/2 directional valve 11, 12 assigned to the respective brake cylinder 3, 4 is switched into the pass-through position only when the working pressure P21, P22 at the respective working port 9, 10 of the relay valve 5 is lower than the pressure $P_3$, $P_4$ in the respective brake cylinder 3, 4, and in that, for a pressure build-up at at least one brake cylinder 3, 4, the 3/2 directional solenoid valve 13 or the second 2/2 directional valve 22 is switched into the pressure build-up position, and the 2/2 directional valve 11, 12 assigned to the respective brake cylinder 3, 4 is switched into or remains in a blocking position for as long as the working pressure P21, P22 at the working port 9, 10, assigned to the at least one brake cylinder 3, 4, of the relay valve 5 remains lower than or equal to the pressure $P_3$, $P_4$ in the respective brake cylinder 3, 4, and the 2/2 directional valve 11, 12 assigned to the respective brake cylinder 3, 4 is switched into the pass-through position only when the working pressure P21, P22 at the respective working port 9, 10 of the relay valve 5 is higher than the pressure $P_3$, $P_4$ in the respective brake cylinder 3, 4.

FIG. 7 illustrates a table in which various switching states of valves of the pressure control device are shown.

In the operating situation designated in said table by "000", it is the intention for the pressure $P_3$ in the first brake cylinder 3 and the pressure $P_4$ in the second brake cylinder 4 to be increased, for example as part of a normal service braking operation. For this purpose, the 3/2 directional solenoid valve is switched into the pressure build-up position, and the two 2/2 directional valves 11 and 12 are switched into the pass-through position. In order that a pressure build-up can take place in the two brake cylinders 3, 4, it is checked, before the switching of the two 2/2 directional valves 11 and 12 into the pass-through position, whether the working pressures P21 and P22 are higher than the pressures $P_3$ and $P_4$ in the brake cylinders, with switching into the pass-through position being performed only if this is the case, and the switching into the pass-through position otherwise being delayed until said condition is satisfied.

In the operating situation designated by "001", it is the intention for the brake pressure $P_4$ only in the second brake cylinder 4 to be increased, whereas the brake pressure $P_3$ in the first brake cylinder 3 is to be held. For this purpose, the 3/2 directional solenoid valve is switched into the pressure build-up position, and the 2/2 directional valve 11 is switched into the blocking position, and the 2/2 directional valve 12 is switched into the pass-through position. In order that a pressure build-up can take place in the second brake cylinder 4, it is checked, before the switching of the 2/2 directional valve 12 into the pass-through position, whether the associated working pressure P21 is higher than the pressure $P_4$ in the second brake cylinder 4, with switching into the pass-through position being performed only if this is the case, and the switching into the pass-through position otherwise being delayed until said condition is satisfied.

In the operating situation designated by "010", it is the intention for the pressure $P_3$ in the first brake cylinder 3 and the pressure $P_4$ in the second brake cylinder 4 to be dissipated. For this purpose, the 3/2 directional solenoid valve is switched into the pressure dissipation position, and the two 2/2 directional valves 11 and 12 are switched into the pass-through position. In order that a pressure dissipation can take place in the two brake cylinders 3, 4, it is checked, before the switching of the two 2/2 directional valves 12 into the pass-through position, whether the working pressures P21 and P22 are lower than the pressures $P_3$ and $P_4$ in the brake cylinders, with switching into the pass-through position being performed only if this is the case, and the switching into the pass-through position otherwise being delayed until said condition is satisfied.

In the operating situation designated by "011", it is the intention for the brake pressure $P_4$ in the second brake cylinder 4 to be decreased and for the brake pressure $P_3$ in the first brake cylinder 3 to be held. For this purpose, the 3/2 directional solenoid valve is switched into the pressure dissipation position, the 2/2 directional valve 11 is switched into the blocking position, and the 2/2 directional valve 12 is switched into the pass-through position. In order that a pressure dissipation can take place in the second brake cylinder 4, it is checked, before the switching of the 2/2 directional valve 12 into the pass-through position, whether the associated working pressure P21 is lower than the pressure $P_4$ in the second brake cylinder 4, with switching into the pass-through position being performed only if this is the case, and the switching into the pass-through position otherwise being delayed until said condition is satisfied.

In the operating situation designated by "100", it is the intention for the brake pressure $P_4$ in the second brake cylinder 4 to be held and for the brake pressure $P_3$ in the first brake cylinder 3 to be increased. For this purpose, the 3/2 directional solenoid valve is switched into the pressure build-up position, and the 2/2 directional valve 11 is switched into the pass-through position, and the 2/2 directional valve 12 is switched into the blocking position. In order that a pressure build-up can take place in the first brake cylinder 3, it is checked, before the switching of the 2/2 directional valve 11 into the pass-through position, whether the associated working pressure P22 is higher than the pressure $P_3$ in the first brake cylinder 3, with switching into the pass-through position being performed only if this is the case, and the switching into the pass-through position otherwise being delayed until said condition is satisfied.

In the operating situation designated by "101", the brake pressure $P_4$ in the second brake cylinder 4 and the brake pressure $P_3$ in the first brake cylinder 3 are initially held. For this purpose, the 3/2 directional solenoid valve is switched for example into the pressure build-up position and the two 2/2 directional valves 11, 12 are switched into the blocking position. Said holding of the pressures by blocking of the two 2/2 directional valves 11, 12 is performed for example only over a time period required by the relay valve 5, owing to its inertia, to bring the working pressures P21 and P22 to a value higher than the brake pressures $P_3$ and $P_4$ in the two brake cylinders. Once said time period has expired, one of the two 2/2 directional valves 11, 12, or else both 2/2 directional valves 11, 12, is or are switched into the pass-through position in order to increase one of the pressures $P_3$ or $P_4$ or in order to increase both pressures $P_3$ and $P_4$. In this respect, "forced holding" is realized here. Furthermore, the pressure control device 1 is in a type of "build-up priority" state, because, by way of the switching of the 3/2 directional valve 13 into the pressure build-up position, preparation has been performed for a pressure build-up in one or both brake cylinders 3, 4.

In the operating situation designated by "110", it is the intention for the brake pressure $P_4$ in the second brake cylinder 4 to be held and for the brake pressure $P_3$ in the first brake cylinder 3 to be decreased. For this purpose, the 3/2 directional solenoid valve is switched into the pressure dissipation position, the 2/2 directional valve 11 is switched into the pass-through position, and the 2/2 directional valve 12 is switched into the blocking position. In order that a pressure dissipation can take place in the first brake cylinder 3, it is checked, before the switching of the 2/2 directional valve 11 into the pass-through position, whether the associated working pressure P22 is lower than the pressure $P_3$ in the first brake cylinder 3, with switching into the pass-through position being performed only if this is the case, and the switching into the pass-through position otherwise being delayed until said condition is satisfied.

In the operating situation designated by "111", the brake pressure $P_4$ in the second brake cylinder 4 and the brake pressure $P_3$ in the first brake cylinder 3 are initially held. For this purpose, the 3/2 directional solenoid valve is switched for example into the pressure dissipation position and the two 2/2 directional valves 11, 12 are switched into the blocking position. Said holding of the pressures by blocking of the two 2/2 directional valves 11, 12 is performed for example only over a time period required by the relay valve 5, owing to its inertia, to bring the working pressures P21 and P22 to a value lower than the brake pressures $P_3$ and $P_4$ in the two brake cylinders 3, 4. Once said time period has expired, one of the two 2/2 directional valves 11, 12, or else both 2/2 directional valves 11, 12, is or are switched into the pass-through position in order to reduce one of the pressures $P_3$ or $P_4$ or in order to reduce both pressures $P_3$ and $P_4$. In this respect, "forced holding" is likewise realized here. Furthermore, the pressure control device 1 is in a type of "dissipation priority" state, because, by way of the switching of the 3/2 directional valve 13 into the pressure dissipation position, preparation has been performed for a pressure dissipation in one or both brake cylinders 3, 4.

Figure 8:
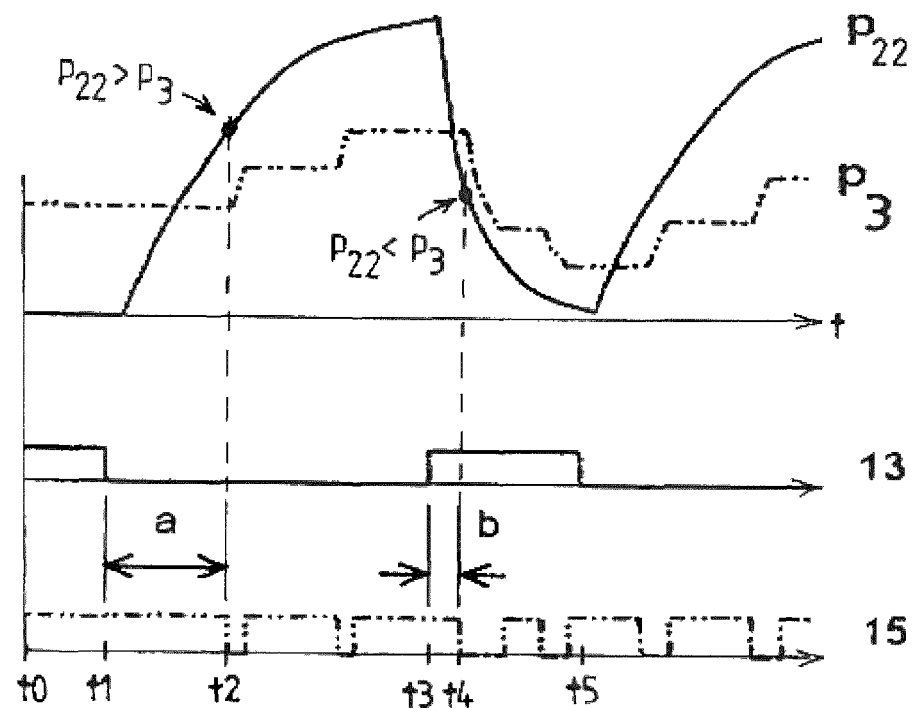
FIG. 8 shows pressure/switching time diagrams which illustrate a changeover of the pressure control device from pressure build-up to pressure dissipation as per an embodiment of the present invention.

FIG. 8 illustrates the profile of the working pressure P22 at the working port 9 of the relay valve 5 and of the pressure $P_3$ in the brake cylinder 3, and the switching profile of the 3/2 directional valve 13 and of the 2/2 directional valve 13, over the time t in an operating situation in which, for example owing to excessive brake slip, in the context of an ABS arrangement, a pressure dissipation has occurred as a starting situation and, after a reduction of the brake slip to an admissible brake slip, the brake pressure is being built up again. Thereafter, owing to assumed re-occurrence of excessive brake slip, another change from pressure build-up to pressure dissipation is necessary.

During the present pressure dissipation at the time t0, at which the 3/2 directional solenoid valve 13 is in its pressure dissipation position (symbolized in FIG. 8 by a high bar depicted using a solid line), the 3/2 directional solenoid valve 13 is, at the time t1, switched into its pressure build-up position (symbolized in FIG. 8 by a low bar depicted using a solid line) (change from pressure dissipation to pressure build-up). At the times t0 and t1, an approximately constant brake pressure $P_3$ greater than 0 prevails in the brake cylinder.

As shown by the pressure profile of the working pressure P22 at the working port 9 assigned to the brake cylinder 3 in FIG. 8, the working pressure P22 however rises only slowly owing to the inertia of the relay valve 5, even though the control port 8 of the relay valve has already been aerated at the time t1 by way of the 3/2 directional solenoid valve 13 switched into the pressure build-up position.

Since the condition P22>$P_3$ is consequently still not satisfied, the 2/2 directional valve 11 assigned to the brake cylinder 3 still remains in the blocking position over a time period a, this being realized by virtue of the 3/2 directional pilot control solenoid valve 15, which effects pilot control of the 2/2 directional valve 11, remaining activated.

If, after expiration of the time period a at the time t2, the condition P22>$P_3$ is satisfied, the 3/2 directional pilot control solenoid valve 15 is actuated in pulsed fashion in order to switch the 2/2 directional valve 11 briefly into the pass-through position and then into the blocking position again, which results in a step-like increase of the pressure p3 in the brake cylinder 3. The first actuation pulse of the 3/2 directional pilot control solenoid valve 15 is followed by a second actuation pulse, whereby, however, the 2/2 directional valve 11 is switched into the pass-through position immediately without a waiting time, because now the condition P22>$P_3$ is immediately satisfied.

If it is then detected at a later time t3 that a pressure dissipation is necessary (change from pressure build-up to pressure dissipation) owing to excessive brake slip, the 3/2 directional solenoid valve 13 is switched from the pressure build-up position into its pressure dissipation position. Here, a pressure dissipation of the working pressure P22 at the working port 9 takes place, in turn, with a time delay, wherein it is only after expiry of a time period b at the time t4 that the condition P22<$P_3$ is satisfied, and therefore only at the time t4 that the 3/2 directional pilot control solenoid valve 15 is actuated in pulsed fashion in order to switch the 2/2 directional valve 11 briefly into the pass-through position and then into the blocking position again, which results in a step-like reduction of the pressure $P_3$ in the brake cylinder 3.

At the time t5, for brake slip regulation reasons, it is for example again the case that a pressure build-up in the brake cylinder 3 is required, for which purpose the 3/2 directional solenoid valve 13 is switched into the pressure build-up position again.

Altogether, therefore, the 2/2 directional valve 11 is switched from its blocking position into the pass-through position preferably in pulsed fashion, wherein the time segments for the pass-through phases and the blocking phases are dependent on the speed with which the pressure $P_3$ in the brake cylinder 3 is to be increased or reduced. The pulsed control of the 2/2 directional valve 11 is in this case performed preferably pneumatically by way of the 3/2 directional pilot control solenoid valve 15, which is actuated in correspondingly electrically pulsed fashion by the control unit. Alternatively, it would however also be possible for the 2/2 directional valve 11 to be a solenoid valve, and to then be actuated directly by the control unit.

The sequence of changes between pressure build-up and pressure dissipation phases described here by way of example only for the first brake cylinder 3 may self-evidently also be implemented in the same or similar fashion at the second brake cylinder 4, or at both brake cylinders 3 and 4 in parallel. Even though the sequence has been presented here by way of example on the basis of ABS regulation, it may self-evidently also be implemented in the context of any desired regulation, in particular in accordance with ASR or ESP regulation. It is also possible, for the above-described sequence, for use to be made of the two 2/2 directional solenoid valves as per FIG. 2 or FIG. 6 instead of the single 3/2 directional solenoid valve 13.

It is preferable, in the methods described above, for the pressures $P_3$, $P_4$ in the brake cylinders 3, 4 and/or the working pressure P21, P22 at the respective working port 9, 10 of the relay valve 5 to be measured by way of a pressure sensor (not shown here) or to be estimated from other variables by way of an estimation algorithm.

It is also preferable for a pressure build-up or a pressure dissipation at the first brake cylinder 3 to be firstly fully completed before a pressure build-up or a pressure dissipation at the second brake cylinder 4 is commenced, and vice versa.

In one refinement, the 3/2 directional solenoid valve 13 or the two 2/2 directional solenoid valves as per FIG. 2 or FIG. 6 are actuated in pulse-width-modulated fashion for the pressure build-up or pressure dissipation. This yields fast switching between the pressure build-up position and the pressure dissipation position, whereby a suspension pressure is generated in the control chamber, which is connected to the control port 8, of the relay valve 5, which improves the reaction time of the relay valve 5 and reduces the inertia thereof to certain extent.

In particular, the 3/2 directional solenoid valve 13, or the two 2/2 directional solenoid valves as per FIG. 2 or FIG. 6, may, in a basic position in which no braking demand exists, be actuated into the pressure dissipation position or into the pressure build-up position.

The method described in FIGS. 7 and 8 and above is provided for the control of a pressure control device 1 according to the embodiments as per FIGS. 1 to 6.

LIST OF REFERENCE NUMERALS

1 Pressure control device
2 Valve unit
3 First brake cylinder
4 Second brake cylinder
5 Relay valve
6 Reservoir port RV
7 Deaeration port RV
8 Control port RV
9 First working port RV
10 Second working port RV
11 2/2 directional valve
12 2/2 directional valve
13 3/2 directional solenoid valve
14 Pressure sink
15 3/2 directional pilot control solenoid valve
16 3/2 directional pilot control solenoid valve
17 Control port
18 Control port
19 Pressure sink
20 Pressure sink
21 First 2/2 directional solenoid valve (outlet valve)
22 Second 2/2 directional solenoid valve (backup valve)
23 Pressure sink
24 Solenoid valve
26 Inlet valve
27 Pressure sensor
28 Pressure sensor The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for controlling a pressure control device (1) of a pressure-medium brake system of a vehicle for wheel-specific control of brake pressures in brake cylinders of wheels of an axle, the pressure control device including
   a relay valve having a reservoir port configured to receive reservoir pressure from a reservoir pressure source, a deaeration port communicating with a pressure sink, a control port configured to receive a relay valve position control signal, and at least two working ports, wherein a first working port of the at least two working ports is assigned to a first brake cylinder of a wheel of a first vehicle side of the axle, and a second working port of the at least two working ports is assigned to a second brake cylinder of a wheel of a second vehicle side of the axle,
   two 2/2 brake cylinder directional valves configured to be directly or indirectly controlled by a control unit, wherein a first one of the two 2/2 brake cylinder directional valves is located between the first working port and the first brake cylinder and a second one of the two 2/2 brake cylinder directional valves is located between the second working port and the second brake cylinder, and the two 2/2 brake cylinder directional valves each are configured to be actuated by the control unit into a pass-through position connecting the respective working port and brake cylinder and into a blocking position, disconnecting the respective working port and brake cylinder, and
   a valve device configured to control actuation of the relay valve via the control port, wherein the valve device is formed by a 3/2 relay valve control directional solenoid valve or by two 2/2 relay valve control directional solenoid valves configured to be actuated by the control unit to actuate the relay valve via the relay valve control port into a pressure build-up position in which a brake control pressure based on a driver braking demand is directed to the relay valve control port to permit reservoir pressure pass out of the first and second working ports and into a pressure dissipation position in which the relay valve control port is in communication with the pressure sink,
the method comprising the acts of:
   dissipating pressure from at least one of the first and second brake cylinders by
      switching the valve device into the pressure dissipation position, and
      switching the respective 2/2 brake cylinder directional valve into the blocking position or maintaining the blocking position as long as a working pressure at the respective relay valve working port is higher than or equal to a pressure in the respective brake cylinder, and switching the respective 2/2 brake cylinder directional valve into the pass-through position when the working pressure at the respective relay valve working port is lower than the pressure in the respective brake cylinder, and building pressure in at least one of the first and second brake cylinders by switching into the pressure build-up position, and switching the respective 2/2 brake cylinder directional valve into the blocking position or maintaining the blocking position as long as the working pressure at the respective relay valve working port is lower than or equal to the pressure in the respective brake cylinder, and switching the respective 2/2 brake cylinder directional valve into the pass-through position when the working pressure at the respective relay valve working port is higher than the pressure in the respective brake cylinder.

2. The method as claimed in claim 1, wherein
at least one of the pressure in the respective brake cylinder and the working pressure at the respective working port is measured by a pressure sensor or estimated by an estimation algorithm.

3. The method as claimed in claim 1, wherein
a pressure build-up or a pressure dissipation at one of the first or second brake cylinders is completed before a pressure build-up or a pressure dissipation at the other of the first or second brake cylinders begins.

4. The method as claimed in claim 1, wherein
the valve device switching is controlled using pulse-width-modulated.

5. The method as claimed in claim 1, wherein
a basic position of the valve device is one of the pressure dissipation position or the pressure build-up position.

6. The method as claimed in claim 1, wherein
at least one of the dissipating pressure act and the building pressure act is performed in response to commands from a wheel-specific brake slip regulation arrangement, a wheel-specific drive slip regulation arrangement or a wheel-specific driving dynamics regulation arrangement.

7. The method as claimed in claim 1, wherein
the brake cylinder first and second 2/2 directional valves are pneumatically pilot-controlled by in each case respective 3/2 directional pilot control solenoid valves controlled by the control unit.

8. The method as claimed in claim 6, wherein
the brake cylinder first and second 2/2 directional valves are diaphragm valves or booster valves configured to be used as 2/2 directional valves.

9. The method as claimed in claim 7, wherein
the control unit controls the respective 3/2 directional pilot control solenoid valves to pass through the reservoir pressure or the brake control pressure based on the driver braking demand to respective control ports of the respective 2/2 directional valves or to connect the respective control ports to the pressure sink.

10. The method as claimed in claim 6, wherein
the control unit generates wheel-specific brake slip regulation on a first one of the vehicle sides by controlling at least of the valve device and the respective one of the 2/2 brake cylinder directional valves on the first vehicle side.

11. The method as claimed in claim 6, wherein
the control unit generates drive slip regulation by controlling a single drive slip regulation solenoid valve and the valve device to connect the control port of the relay valve to the brake control pressure based on the driver braking demand, to the reservoir pressure or to the pressure sink.

12. The method as claimed in claim 11, wherein
the single drive slip regulation solenoid valve is a 3/2 directional solenoid valve.

13. The method as claimed in claim 11, wherein
the first one of the two 2/2 relay valve control directional solenoid valves of the valve device is an outlet valve having a pressure dissipation position arranged to connect the control port of the relay valve to the pressure sink and a blocking position arranged to block connection of the control port of the relay valve to the pressure sink, the second one of the two 2/2 relay valve control directional solenoid valves of the valve device is configured as a backup valve having a pressure build-up position arranged to connect the control port of the relay valve to the brake control pressure based on the driver braking demand and a blocking position arranged to block connection of the control port of the relay valve to the pressure sink brake control pressure based on the driver braking demand, and the single drive slip regulation solenoid valve is an inlet 2/2 directional solenoid valve.

14. The method as claimed in claim 13, wherein
the control unit receives pressure signals from at least one pressure sensor connected in a pressure-conducting manner to at least one of the working ports of the relay valve.

15. The method as claimed in claim 14, wherein
the control unit controls the single drive slip regulation solenoid valve and the first one of the two 2/2 relay valve control directional solenoid valves of the valve device to maintain an actual brake pressure measured by the at least one pressure sensor at a setpoint brake pressure based on the driver braking demand.

16. The method as claimed in claim 15, wherein
the control unit receives pressure signals from at least one driving dynamics regulation pressure sensor arranged to measure the brake control pressure based on the driver braking demand.

17. The method as claimed in claim 16, wherein
during a driving dynamics regulation braking operation the control unit controls at least the valve device and drive slip regulation solenoid valve such that
the control port of the relay valve receives reservoir pressure in a manner dependent on a vehicle yaw rate,
the first one of the 2/2 brake cylinder directional valves on the first vehicle side is switched into the pass-through position, and
the second one of the 2/2 brake cylinder directional valves on the other vehicle side is switched into the blocking position.

* * * * *